Feb. 21, 1956  J. BOYCE  2,735,446
FILLING VALVE
Filed Aug. 1, 1951
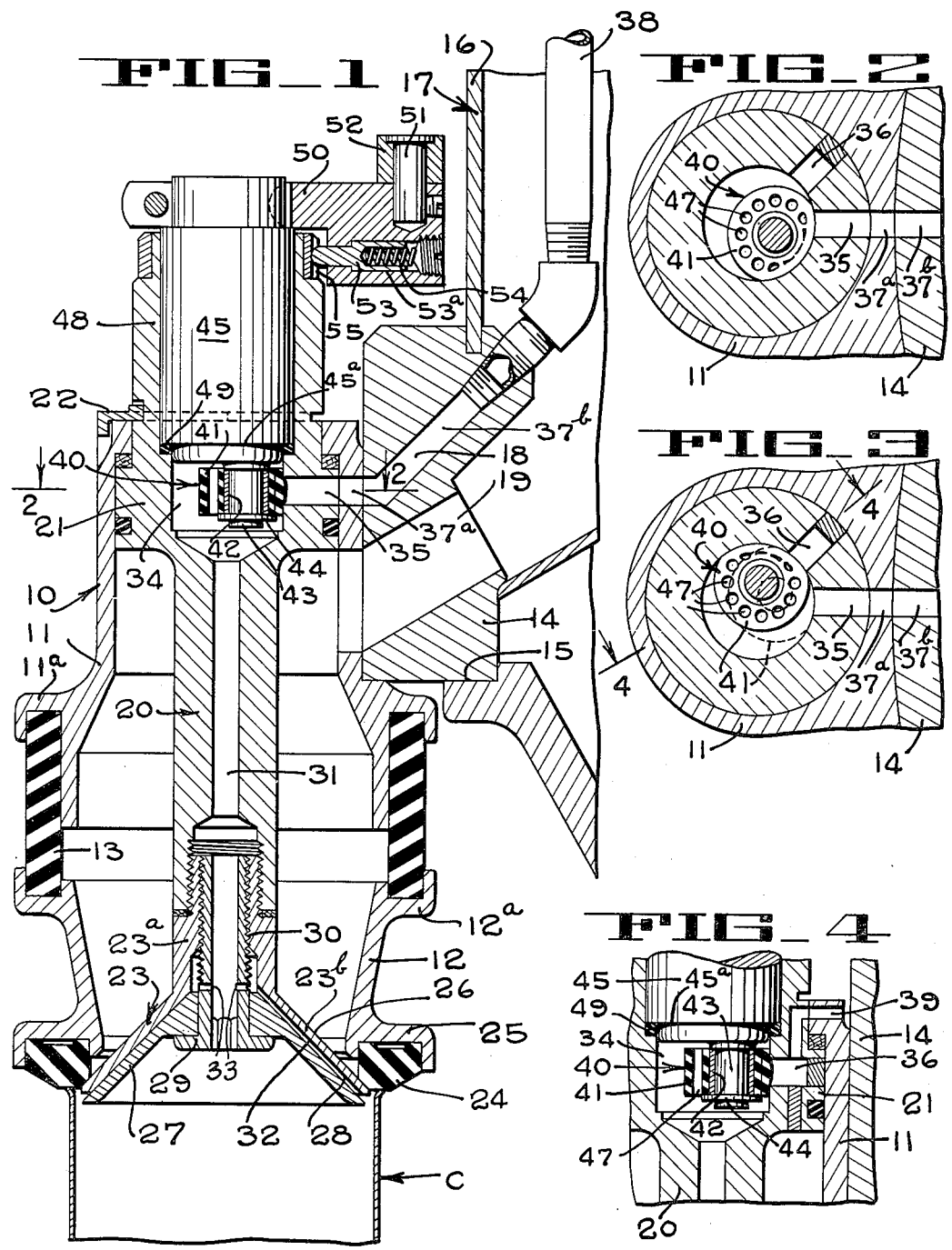
INVENTOR
JOHN BOYCE
BY Hans G. Hoffmeister
ATTORNEY

United States Patent Office 2,735,446
Patented Feb. 21, 1956

2,735,446

FILLING VALVE

John Boyce, San Jose, Calif., assignor to Food Machinery and Chemical Corporation, San Jose, Calif., a corporation of Delaware Application August 1, 1951, Serial No. 239,781

2 Claims. (Cl. 137—625.42)

This invention relates to filling valves and more particularly to filling valves which are employed to dispense measured amounts of syrup, brine and other liquid substances into containers.

Particular problems arise in connection with such valves in that they must at all times be in a sanitary condition and able to dispense a closely regulated amount of liquid into the containers. When liquids such as syrups having a high sugar content are handled, certain portions of the valve which are intermittently subjected to air and syrup become covered with crystallized sugar which, if not removed at frequent intervals, interferes with the sanitary condition of the valve and the amount of liquid dispensed since certain movable elements of the valve mechanism may stick and liquid conduits thereof may become clogged.

An object of the present invention is to provide a filling valve which will effectively dispense measured amounts of liquids over an extended period of time with a minimized need for disassembly and cleaning.

Another object of the invention is to provide a filling valve having improved closure means for its fluid conduits.

A further object is to provide such closure means which will automatically cleanse itself and will not stick during operation.

These and other objects will become apparent from the following description of the accompanying drawing which illustrates a preferred embodiment of the invention and wherein:

Fig. 1 is a vertical sectional view of a filling valve embodying the invention, said valve being mounted upon a liquid supply tank.

Fig. 2 is a fragmentary sectional view taken on line 2—2 of Fig. 1 illustrating a vent and vacuum control valve which is comprised in the filling valve structure shown in Figure 1.

Fig. 3 is a sectional view similar to Fig. 2 illustrating different operational positions of the control valve.

Fig. 4 is a fragmentary vertical section taken on the line 4—4 of Fig. 3.

With particular reference to Fig. 1, the filling valve 10 comprises upper and lower cylindrical housing portions 11, 12, connected by a deformable rubber sleeve 13 which is sealingly received between opposed cup-like flanges 11a and 12a formed on the respective housing portions to yieldably urge the housing portions away from one another. The upper housing portion 11 of the valve is rigidly supported in a vertical position from a block 14 that is fitted into and closes an opening 15 in the wall 16 of a liquid supply tank 17, the arrangement being such as to provide registration of openings 18 and 19 in said housing portion and said block respectively. Through these registering openings a constant liquid supply is afforded from the tank to the interior of the valve. A vertically disposed hollow valve stem 20 extends centrally through both housing portions o fthe valve, and has an enlarged portion 21 at its upper end which sealingly engages the upper portion 11 of the valve housing and which is supported from said upper housing portion 11 by a horseshoe clamp 22. The tubular portion 23a of a valve head in the form of an inverted funnel 23 is threadedly received at the lower end of the valve stem 20 in a position such that a resilient ring 24 pressed into an annular cup-like lip 25 at the bottom of the lower housing portion 12 is urged by rubber sleeve 13 into engagement with the exterior surface 26 of the cone-shaped portion 23b of said valve head 23. It is, accordingly, apparent that a sealing engagement between the ring 24 and the seating surface 26 formed by the cone-shaped funnel portion will be maintained until a container or can C of proper dimensions is urged upwardly into contact with the resilient ring 24 to move said ring and the lower portion 12 of the valve housing upwardly against the urgency of the rubber sleeve 13 whereupon liquid from the interior of the valve may pass over the conical valve seating surface 26 and discharge in a tubular stream into the container C. In accordance with common practice, the lower portion of the valve head 23 is arranged to project a limited distance into a container in filling position to displace a predetermined volume therein and thus provide a desired head space, when the container is subsequently retracted from the valve.

A conical cap 27 is received within the conical portion 23b of the valve head 23 and is clamped to said valve head by means of a hollow screw stud 29 which extends upwardly and is threadedly received in the correspondingly threaded bore 30 of the stem portion 23a of said valve head. Thus, a central axial passage 31 is provided through the hollow stud 29 and upwardly through the hollow valve stem 20. In addition, a plurality of radially extending grooves 32 are formed in the under surface 28 of the conical portion 23b of the valve head 23 and communicate through radial openings 33 in the hollow stud 29 with the described central passage 31.

The central bore of the valve stem 20 is expanded at its upper end to form a cylindrical chamber 34 from which two channels 35, 36 extend radially. One channel 35 communicates through registering passages 37a and 37b in the wall of the valve housing 11 and the block 14, respectively, with a pipe 38 within the tank 17, which pipe is connected to a source of vacuum. The other channel 36 communicates with the atmosphere through a small bore 39 in the valve housing 11 (Fig. 4).

Valve means 40 are provided within the chamber 34 to control communication between the interior of said chamber and the described channels 35, 36. To this end, a cylindrical valve member or rubber roll 41 surrounds a bearing 42 that is rotatably held on a stem 43 by means of a snap ring 44. The stem 43 depends eccentrically from a shaft 45 into the chamber 34 in such a manner that the roll 41 is at all times deformed by compression against a segment of the chamber wall (Fig. 2). In order that the roll 41 may be more readily deformed, a plurality of holes 47 are provided in said roll in a direction parallel to the axis of the mounting stem 43. The shaft 45, from which stem 43 depends, is rotatably supported in an upper radially expanded cylindrical extension 48 of the tubular valve stem 20, and a resilient O-ring 49 is interposed between said stem extension 48 and said shaft 45 beneath a shoulder 45a formed at the lower end of said shaft to preclude leakage to or from the chamber 34 thereunder. As will be readily understood, when the shaft 45 is rotated the dependent eccentric stem 43 travels along a circular orbit and new segments of the wall of chamber 34 (Fig. 3) will continually be engaged by the rubber roll 41. The size of the roll 41 and the eccentricity of the stem 43 are so chosen as to enable said roll to close one or both of the entrances to the channels 35 and 36 depending upon its rotary position.

To move the roll 41 into its different operational positions a radially directed arm 50 may be connected to the upper end of the shaft 45 and mounts at its lateral extremity a vertically extending pin 51 which rotatably supports a cam follower roller 52. In conventional turret-type filling machines the supply tank with the filling valves supported therefrom is usually rotated, and the cans or containers to be filled are each moved below the tank in a circular path synchronously with a respective filling valve. In machines of this type a stationary cam track (not shown) may be provided for the cam follower rollers 52 and may be arranged to engage said rollers and swing their supporting arms 50 into positions that place the rubber rolls 41 at the proper place relative to the wall of their respective chambers 34. To assure that a roll 41 is maintained in a given position, a detent 53 slidably supported within a radial aperture 53a in the actuating arm 50 is urged by a spring 54 into one of a plurality of notches 55 formed on the exterior of the valve stem extension 48 that supports the shaft 45, each of said notches corresponding to one of the operational positions of the rubber roll 41 within the chamber 34.

In practical operation a container is first moved upwardly into sealing engagement with the resilient ring 24 (Fig. 1) at the lower end of the filling valve, but is not raised sufficiently to lift the ring from sealing engagement with the conical valve seating surface 26. At this point the rotary position of the roll 41 is such that the interior of the container is in communication with the atmosphere through the hollow valve stem 20 and the channel 36, while the vacuum channel 35 is closed by the engagement of the rubber roll 41 with its entrance (Fig. 2).

In the position shown in Figs. 1 and 2, the can and filling valve rotate synchronously over a predetermined arc, whereupon the aforementioned stationary control cam (not shown) engages the cam follower roller 52 to rotate the shaft 45 and move the eccentric stem 43 into a position in which the rubber roll 41 covers the entrance to the atmosphere channel 36 and frees the entrance of the vacuum channel 35 (Fig. 3). As a result thereof, the can C, the hollow valve stem 20 and the chamber 34 are vacuumized.

Thereafter the cam roller 52 is again engaged to shift the rubber roll 41 into the position indicated by dotted lines in Fig. 3 wherein it shuts off both the atmosphere and vacuum channels 35, 36. The container is then moved upwardly to open the valve in the manner previously described so that liquid may be drawn from the supply tank into the evacuated container. Liquid continues to flow into the container until the same is filled whereupon a certain amount of the liquid passes vertically into the evacuated passage 31 in the hollow valve stem 20 and into the chamber 34 where it remains until further camming actuation shifts the rubber sleeve 41 back into the position shown in Fig. 2 wherein communication is re-established with the atmosphere. At this time, the can is moved downwardly so that the liquid within the chamber 34 and passage 31 may flow into the container to compensate to a predetermined degree for the displacement of liquid resultant from the described projection of the valve head 23 into the container during the filling operation.

The filled can is then removed from the filling mechanism whereupon an empty container may then be positioned beneath the valve so that the described cycle of operation may again be repeated.

It will be noted that during the described filling operation, the chamber 34 and the roll 41 are alternately subjected to air, vacuum and liquid. If the liquid happens to be a syrup, repeated operations tend to leave a layer of crystallized sugar on these parts. However, owing to the fact that the valve control roll 41 is subjected to variant deformation during operation of the described filler mechanism, the crystallized sugar is dislodged from its surface and from the wall segments of the chamber contacted thereby. A continual cleansing process is therefore carried on which prevents the roll from sticking and maintains the vent and vacuum channels unblocked, and thus precludes misoperation. Perforce, the need for frequent disassembly and cleansing of these parts is substantially reduced.

It will be apparent that the present invention is not limited to vacuum-type filling valves, but may be incorporated in other structures wherein sugar crystallization and similar deposits are formed. Accordingly, I do not wish to be limited to the particular embodiment of the invention illustrated and described, but give reference to the appended claims which express the scope of the invention.

What I claim and desire to protect by Letters Patent is:

1. Valve structure comprising a valve chamber defined by a cylindrical wall and having an axially disposed passage therein, said chamber wall having a pair of adjacent ports extending radially therethrough, a shaft rotatably mounted in said chamber and having an eccentric valve stem projecting thereinto, a cylindrical valve of deformable material rotatably mounted on said stem, the distance between the valve stem axis and the wall between said ports being less than the radius of an uncompressed portion of the cylindrical valve by an amount sufficient to deform and compress a peripheral valve portion against the chamber wall to such an extent as to cover said ports simultaneously in one position of the valve, and means for rotating said shaft to roll the deformed peripheral valve portion along said chamber wall while maintaining it in compressed condition, whereby to selectively close said ports in other positions of the valve.

2. Valve structure as defined in claim 1 wherein said cylindrical valve is provided with a plurality of circumferentially spaced apertures extending longitudinally therethrough to facilitate deforming and compressing said peripheral valve portion tightly against said chamber wall during its rolling movement therealong.

References Cited in the file of this patent

UNITED STATES PATENTS

| 12,950 | Hollely | May 29, 1855 |
| 109,730 | Hanks | Nov. 29, 1870 |
| 514,708 | Finnigan | Feb. 13, 1894 |
| 585,035 | Houston | June 22, 1897 |
| 806,692 | Meyersberg | Dec. 5, 1905 |
| 870,377 | Marett | Nov. 5, 1907 |
| 934,045 | Cotter | Sept. 14, 1909 |
| 2,165,874 | Sauls | July 11, 1939 |
| 2,431,593 | Strike | Nov. 25, 1947 |
| 2,534,577 | Courtot | Dec. 19, 1950 |

FOREIGN PATENTS

| 76,229 | France | Apr. 27, 1867 |
| 385,840 | Great Britain | Dec. 19, 1950 |